United States Patent
Oonishi et al.

(10) Patent No.: US 10,716,316 B2
(45) Date of Patent: Jul. 21, 2020

(54) CHOCOLATE, METHOD FOR PRODUCING CHOCOLATE-COVERED FOOD PRODUCT COATED BY THE SAME, AND METHOD FOR PREVENTING INCREASE IN VISCOSITY OF CHOCOLATE FOR COATING

(71) Applicant: The Nisshin OilliO Group, Ltd., Tokyo (JP)

(72) Inventors: Kiyomi Oonishi, Yokosuka (JP); Yuusuke Hasegawa, Yokosuka (JP); Noriko Murayama, Yokosuka (JP); Iwao Hachiya, Yokosuka (JP)

(73) Assignee: The Nisshin OilliO Group, Ltd., Tokyo (JP)

( * ) Notice: Subject to any disclaimer, the term of this patent is extended or adjusted under 35 U.S.C. 154(b) by 1038 days.

(21) Appl. No.: 14/572,453

(22) Filed: Dec. 16, 2014

(65) Prior Publication Data

US 2015/0104553 A1 Apr. 16, 2015

Related U.S. Application Data

(63) Continuation of application No. PCT/JP2013/067580, filed on Jun. 26, 2013.

(30) Foreign Application Priority Data

Jun. 27, 2012 (JP) ................. 2012-143870
Oct. 10, 2012 (JP) ................. 2012-224897
Nov. 28, 2012 (JP) ................. 2012-259361

(51) Int. Cl.
*A23G 1/36* (2006.01)
*A23G 1/30* (2006.01)
*A23G 1/54* (2006.01)

(52) U.S. Cl.
CPC .............. *A23G 1/36* (2013.01); *A23G 1/305* (2013.01); *A23G 1/54* (2013.01); *A23V 2002/00* (2013.01)

(58) Field of Classification Search
CPC . A23G 1/305; A23G 1/54; A23G 1/38; A23G 1/36
USPC ......................................... 426/306
See application file for complete search history.

(56) References Cited

U.S. PATENT DOCUMENTS

| | | | |
|---|---|---|---|
| 5,928,701 A | 7/1999 | Jensen et al. | |
| 5,928,704 A | 7/1999 | Takeda et al. | |
| 6,391,356 B1 | 5/2002 | Willcocks et al. | |
| 6,894,178 B1 | 5/2005 | Windhab et al. | |
| 2009/0274803 A1 | 11/2009 | Descamps et al. | |
| 2010/0278985 A1 | 11/2010 | Akahane et al. | |
| 2013/0230634 A1 | 9/2013 | Arai et al. | |

FOREIGN PATENT DOCUMENTS

| | | | |
|---|---|---|---|
| EP | 0496310 | 7/1992 | |
| EP | 0496310 A1 * | 7/1992 | ............... A23D 9/00 |
| EP | 1249174 | 10/2002 | |
| EP | 2622966 A1 * | 8/2013 | ............... A23D 9/00 |
| JP | S63-240745 | 10/1988 | |
| JP | S64-060330 | 3/1989 | |
| JP | H02-000406 | 1/1990 | |
| JP | H02-242639 | 9/1990 | |
| JP | H09-103244 | 4/1997 | |
| JP | 2000-109879 | 4/2000 | |
| JP | 2000-139352 | 5/2000 | |
| JP | 3401904 | 4/2003 | |
| JP | 2004-500025 | 8/2004 | |
| JP | 2004-298041 | 10/2004 | |
| JP | 2005-073611 | 3/2005 | |
| JP | 2008-005745 | 1/2008 | |
| JP | 2008-154555 | 7/2008 | |
| JP | 2008-206490 | 9/2008 | |
| JP | 2009-153425 | 7/2009 | |
| JP | 2009-537164 | 10/2009 | |
| JP | 2011-004604 | 1/2011 | |
| JP | WO 2012043548 A1 * | 4/2012 | ............... A23D 9/00 |
| WO | WO1998030108 | 7/1998 | |
| WO | WO2009060809 | 5/2009 | |
| WO | WO2012043548 | 4/2012 | |

OTHER PUBLICATIONS

Chinese Office Action in Chinese Application No. 201380027587.9, dated Feb. 4, 2017, 9 pages (with partial English translation).
Hong et al., "Characteristics of Cacao Butter and Its Substitutes," Food Science, 2009, vol. 30, 4th term, pp. 178-181 (with partial English translation).
Liang, Tiang, "Tempering of Chocolate (I)," Food Industry, 1993, 4th term, pp. 6-10 (with partial English translation).
Hachiya et al., "Crystallization Behavior of Dark Chocolate Seeded with Crystal of Fat Materials," Food Research and Development Laboratories, Apr. 1998, 38(9): 699-704 (with English translation).
International Search Report for International Application PCT/JP2013/067580, dated Oct. 1, 2013.
Siree Chaiseri et al: "Lipid and hardness characteristics of cocoa butters from different geographic regions", Journal of the American Oil Chemists' Society (JAOCS), Springer, DE, vol. 66, No. 12, Dec. 1989 (Dec. 1989), pp. 1771-1776, XP008178871.
Extended European search report for European Patent Application No. 13810150.6 dated Feb. 18, 2016.

(Continued)

*Primary Examiner* — Jyoti Chawla
(74) *Attorney, Agent, or Firm* — Fish & Richardson P.C.

(57) ABSTRACT

Features of the present disclosure provide a chocolate with good heat-resistance, bloom resistance and melt-in-the-mouth property, disclose a production method by which a chocolate-covered food product coated with the chocolate is produced, and disclose a method for preventing an increase in the viscosity of chocolate mix. Disclosed is a method for producing a chocolate comprising an addition step for adding a seeding agent containing at least β-StOSt crystal to chocolate mix in a melted state, wherein the fat content of the chocolate mix is 26 to 70 mass % StOSt (where StOSt is 1,3-distearoyl-2-oleylglycerol).

6 Claims, 1 Drawing Sheet

(56) References Cited

OTHER PUBLICATIONS

Office Action issued in Chinese Application No. 201380027587.9 dated Nov. 2, 2015, 9 pages.
Qianghua et al., "The Tempering of Chocolate and its Development," China Academic Journal Electronic Publishing House, Dec. 31, 2003, pp. 16-17, partial translation.
Hachiya et al., "Seeding Effects on Solidification Behavior of Cocoa Butter and Dark Chocolate. I. Kinetics of Solidification," Journal of the American Oil, vol. 66, No. 12, pp. 1757-1762, Dec. 1989.
Hachiya et al., "Seeding Effects on Solidification Behavior of Cocoa Butter and Dark Chocolate. II. Physical Properties of Dark Chocolate," Journal of the American Oil, vol. 66, No. 12, pp. 1763-1770, Dec. 1989.
Office Action issued to CN Patent Application No. 201380027587.9, dated Aug. 23, 2017.
KR Office Action in Korean Appln. No. 10-2014-7035616, dated May 24, 2019, 11 pages.

* cited by examiner

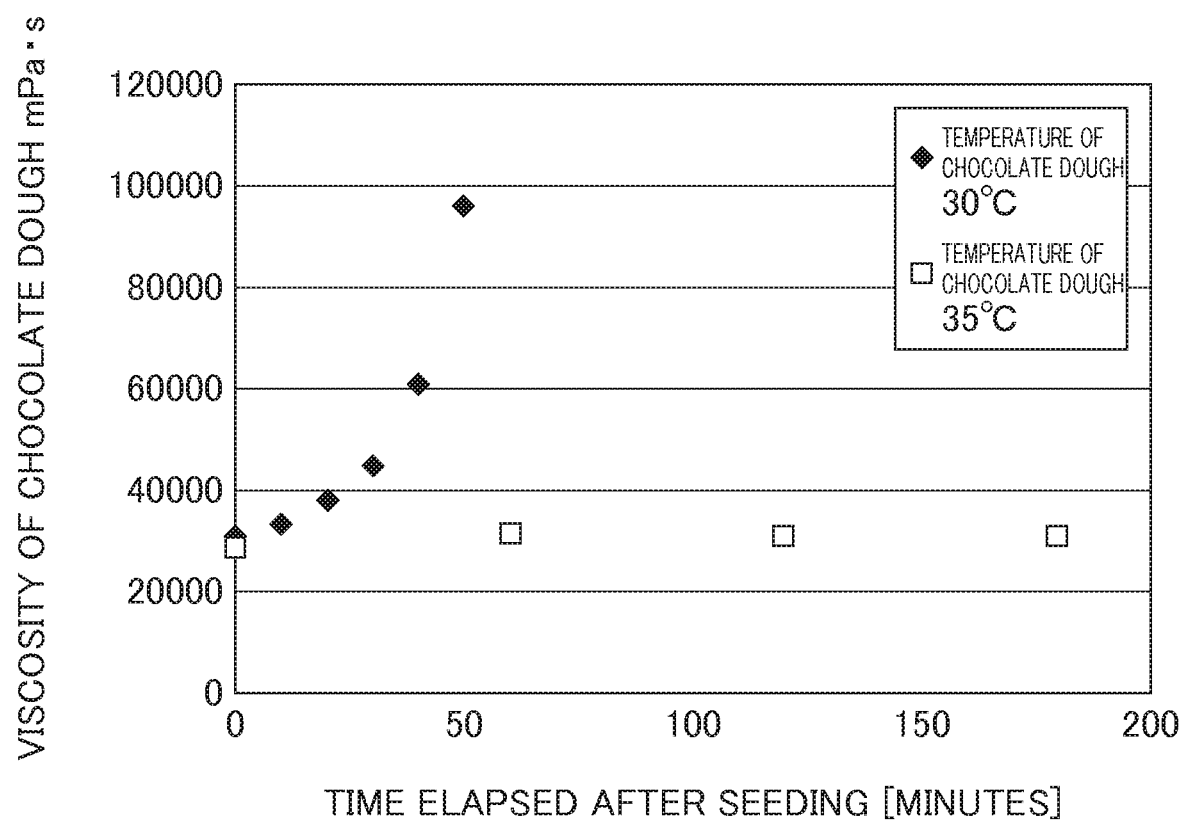

CHOCOLATE, METHOD FOR PRODUCING CHOCOLATE-COVERED FOOD PRODUCT COATED BY THE SAME, AND METHOD FOR PREVENTING INCREASE IN VISCOSITY OF CHOCOLATE FOR COATING

TECHNICAL FIELD

The present invention relates to chocolate, a method for producing a chocolate-covered food product coated with the same, and a method for preventing an increase in viscosity of chocolate mix.

BACKGROUND ART

Chocolate, which is made mostly from cacao beans, is a highly palatable food item having a good flavor and a good melt-in-the-mouth-property. A tempered chocolate known as chocolate of general type (including chocolate containing only cocoa butter contained in cacao beans as an oil and fat component) is usually obtained by subjecting chocolate mix in a melted state obtained from chocolate raw materials to a tempering operation, followed by cooling solidification of the chocolate mix.

A tempering operation is an operation to generate a crystal core of a stable crystal in chocolate mix in a melted state, in order to solidify cocoa butter which can take various crystal structures as a stable crystal. Concretely, for instance, tempering is known as an operation where chocolate mix in a melted state at a temperature of 40 to 50° C. is cooled down to the temperature of about 27 to 28° C. and, then, heated again up to about 29 to 31° C.

When an amount of a stable crystal generated in a tempering operation is appropriate, a solidification speed in cooling chocolate mix becomes faster, so that sufficient contraction occurs while the chocolate mix solidifies. Further, chocolate after solidification is easily released from a mold (namely, good in mold releasing property), generation of fat bloom (referring to a phenomenon in which white crystal of oil and fat generates on a surface of chocolate and hereinafter referred to as "bloom") is suppressed, and chocolate with good gloss is obtained. Furthermore, bloom resistance during storage of the obtained chocolate is also good.

On the other hand, if an amount of a stable crystal generated in a tempering operation is small, bloom tends to generate, which results in lowered bloom resistance during the storage of the obtained chocolate, so that bloom may generate in a short period. Furthermore, if an amount of a stable crystal generated in a tempering operation is large, the texture of the obtained chocolate becomes rough, which may lower bloom resistance during storage of chocolate. Therefore, control of a tempering operation is very important in the production of chocolate.

As a method for performing a tempering operation conveniently, a method referred to as "a seeding method" or "seeding" is known, where a stable crystal of a symmetrical triacylglycerol etc. is added to chocolate mix as a seeding agent. Since the seeding agent functions as a crystal core for a stable crystal, a tempering operation can be carried out conveniently by means of the seeding agent. As a seeding method, a method where, for instance, a crystal of 1,3-distearoly-2-oleoylglycerol (StOSt) or 1,3-dibehenyl-2-oleoylglycerol (BOB) is added as a seeding agent has been developed (for instance, Patent Literatures 1 to 5).

Patent Document 1: Japanese Unexamined Patent Application, Publication No. S63-240745
Patent Document 2: Japanese Unexamined Patent Application, Publication No. S64-060330
Patent Document 3: Japanese Unexamined Patent Application, Publication No. H02-000406
Patent Document 4: Japanese Unexamined Patent Application, Publication No. H02-242639
Patent Document 5: Japanese Unexamined Patent Application, Publication No. 2008-005745

DISCLOSURE OF THE INVENTION

Problems to be Solved by the Invention

However, the chocolate mix to be subjected to a tempering operation is usually held at about 30° C. If the seeding method using a crystal is applied to the chocolate mix having such a temperature, viscosity of the chocolate mix increases over time, which is known to deteriorate the handling property of the chocolate mix.

Here, as a method for preventing increase in viscosity of chocolate mix, a method for increasing a temperature of chocolate mix may be mentioned. When such a method is carried out, it is necessary to use a heat-resistant seeding agent. For instance, since a crystal of BOB is more heat-resistant than a crystal of StOSt (the melting point of a crystal of BOB ($\beta_2$-3 form crystal) is 53° C. and that of StOSt ($\beta_2$-3 form crystal) is 41° C.), a crystal of BOB appears to be preferred as a seeding agent to be used when temperature of chocolate mix is high.

However, in the case where a BOB crystal is added as a seeding agent to chocolate mix at a high temperature, if an added amount is small, the BOB crystal melts and loses its function as a seeding agent. Therefore, it is necessary to use a large amount of BOB crystal (for instance, about 5% by mass relative to an oil component of chocolate mix). On the other hand, using a large amount of BOB crystal not only increases costs, but also causes problems that the obtained chocolate becomes worse in bloom resistance or melt-in-the-mouth property and only chocolate of lower palatability is obtained.

Further, even in the chocolate mix obtained under a sufficient control of a tempering operation, such a problem arises that after the preparation of chocolate mix, an oil and fat in the chocolate mix keeps on crystallizing, whereby viscosity of the chocolate mix increases over time, whereby handling ability of the chocolate mix is lowered. Particularly, in the case of the chocolate mix in a melted state used for coating confectionery or bread, it is desired that viscosity of the chocolate be prevented from increasing and be easily maintained in a constant range.

Therefore, there was a need for a production method which uses a simple seeding method but can prevent an increase in viscosity of chocolate mix, and with which chocolate with good heat-resistance, bloom resistance, and melt-in-the-mouth property as well as a chocolate-covered food product coated with the chocolate are obtained.

The present invention has been made in viewing the afore-mentioned circumstances and aims to provide: chocolate with good heat-resistance, bloom resistance and melt-in-the-mouth property; a production method by which a chocolate-covered food product coated with the chocolate is obtained; and a method for preventing an increase in the viscosity of chocolate mix.

Means for Solving the Problems

The present inventors have made intensive researches in order to solve the afore-mentioned problems and have found unexpectedly that addition of a seeding agent comprising at least a β form StOSt crystal to chocolate mix in a melted state comprising a particular amount of StOSt solves the problems and have completed the present invention. Concretely, the present invention provides the following.

(1) A method for producing chocolate, comprising an addition step of adding a seeding agent comprising at least a β form StOSt crystal to chocolate mix in a melted state,
wherein the chocolate mix comprises 26 to 70% by mass of StOSt in an oil and fat in the chocolate mix,
provided that StOSt is 1,3-distearoyl-2-oleoyglycerol.
(2) The method for producing chocolate according to (1), wherein the temperature of the chocolate mix in the addition step is 32 to 40° C.
(3) The method for producing chocolate according to (1) or (2), further comprising a holding step of holding the temperature of the chocolate mix at 32 to 40° C. for 10 minutes or more after the addition step.
(4) The method for producing chocolate according to any one of (1) to (3), wherein, in the addition step, the β form StOSt crystal is added in an amount of 0.05 to 5% by mass relative to the oil and fat in the chocolate mix.
(5) The method for producing chocolate according to any one of (1) to (4), wherein the β form StOSt crystal is a crystal derived from the oil and fat containing 40% by mass or more of StOSt.
(6) The method for producing chocolate according to any one of (1) to (5), further comprising a cooling solidification step of cooling and solidifying the chocolate mix after the addition step.
(7) A chocolate composite food product, wherein the chocolate obtained by the method for producing chocolate according to any one of (1) to (6) is used.
(8) A method for preventing an increase in viscosity of chocolate mix, wherein a β form StOSt crystal is added to the chocolate mix in a melted state with a temperature of the chocolate mix being 32 to 40° C.
(9) The method for preventing an increase in viscosity of chocolate mix according to (8), wherein the viscosity of the chocolate mix is suppressed, for 30 minutes or more after the addition of the β form StOSt crystal, to 1.2 times or less of the viscosity of the chocolate mix at the time when the β form StOSt crystal is added.
(10) A method for producing a chocolate-covered food product comprising the following steps A, B, and C:
step A: a preparation step of preparing chocolate mix in a melted state with an StOSt content in oil and fat in chocolate mix being 26 to 70% by mass;
step B: an addition step of adding a seeding agent comprising at least a β form StOSt crystal to the chocolate mix in a melted state; and
step C: a coating step of coating a food product with the chocolate mix obtained in the step B,
provided that StOSt is 1,3-distearoyl-2-oleolyglycerol.
(11) The method for producing a chocolate-covered food product according to (10), wherein the temperature of the chocolate mix in a melted state is 32 to 40° C. in the step B.
(12) The method for producing a chocolate-covered food product according to (10) or (11), wherein the temperature of the chocolate mix at the time when the food product is coated with the chocolate mix in the step C is 32 to 40° C.
(13) The method for producing a chocolate-covered food product according to any one of (10) to (12), wherein the β form StOSt crystal is added in an amount of 0.05 to 5% by mass relative to the oil and fat in the chocolate mix in a melted state in the step B.
(14) The method for producing a chocolate-covered food product according to any of (10) to (13), wherein the β form StOSt crystal is a crystal derived from the oil and fat comprising StOSt in an amount of 40% by mass or more in the step B.
(15) The method for producing a chocolate-covered food product according to any of (10) to (14), wherein the chocolate mix at the time when the food product is coated in the step C is the chocolate mix after a lapse of 15 minutes or more after the addition of the seeding agent in the step B.
(16) The method for producing a chocolate-covered food product according to any of (10) to (15), wherein the temperature of the food product at the time when the food product is coated with the chocolate mix in the step C is 30 to 40° C.
(17) The method for producing a chocolate-covered food product according to any of (10) to (16), further comprising the following step D after step C,
step D: a cooling solidification step of cooling and solidifying the chocolate mix in the food product obtained in the step C.

Effects of the Invention

According to the present invention, chocolate having a good heat resistance, bloom resistance and a melt-in-the-mouth property; a method for producing a chocolate-covered food product coated with the same; and a method for preventing an increase in the viscosity of chocolate mix are provided.

BRIEF DESCRIPTION OF THE DRAWINGS

FIG. 1 Change in viscosity over time of chocolate mixs having different temperatures after the addition step.

PREFERRED MODE FOR CARRYING OUT THE INVENTION

The embodiments of the present invention will be described in detail. The present invention is not limited to the following embodiments.

The production method of the present invention comprises an addition step wherein a seeding agent comprising at least a β form StOSt crystal is added to chocolate mix in a melted state. The content of StOSt in the oil and fat in the chocolate mix is 26 to 70% by mass. The addition step in the present invention falls under a so-called seeding step. Further, in the following description, "StOSt" is 1,3-distearoyl-2-oleolyglycerol. Furthermore, "BOB" is 1,3-dibehenyl-2-oleolyglycerol.

(Chocolate Mix)

"Chocolate mix" in the present invention indicates chocolate in a liquid state which is obtained via pulverization or conching of raw materials of chocolate and which is in a previous state to be cooled and solidified into solid chocolate finally.

The chocolate mix "in a melted state" in the present invention indicates chocolate mix whose oil and fat is melted. Whether or not chocolate mix is in a melted state is determined by confirming the releasing property of the chocolate mix after being cooled and solidified. When the cooled and solidified chocolate mix is not released from the mold (concretely, when the releasing percentage of chocolate mix from the mold is less than 70%), it is determined that the chocolate mix is in a melted state.

"Oil and fat in chocolate mix" in the present invention indicates not only a single oil and fat such as cocoa butter, but also all the combined oils and fats contained in the raw materials of chocolate mix, including cacao mass, cocoa powder and whole milk powder. For instance, the content of oil and fat in cacao mass (cocoa butter) is generally 55% by mass, the content of oil and fat in cocoa powder (cocoa butter) is 11% by mass, and the content of oil and fat in whole milk powder (milk fat) is 25% by mass. Therefore, the content of oil and fat in chocolate mix equals to the sum of the products of formulated amounts in the chocolate mix of each raw material (% by mass) and oil contents.

The chocolate mix in the present invention contains 26 to 70% by mass of StOSt in the oils and fats contained in the chocolate mix. When an StOSt content in chocolate mix is in the afore-mentioned range, the chocolate obtained after cooling solidification of the chocolate mix is provided not only with a heat resistance (in other words, sticky feel is avoided when picking up chocolate), but also with better melt-in-the-mouth property and bloom resistant property. The StOSt content contained in the chocolate mix in the present invention is preferably 27 to 70% by mass, more preferably 30 to 60% by mass, even more preferably 34 to 55% by mass, and the most preferably 40 to 55% by mass, in the oils and fats contained in the chocolate mix.

The chocolate mix in the present invention is preferably of a tempered type, in order to efficiently obtain the effect attained by seeding. As the chocolate mix of a tempered type, mention may be made of chocolate mix containing 40 to 90% by mass of an SOS type triacylglycerol (hereinafter also referred to as "SOS") in the oils and fats in the chocolate mix. Here, the SOS type triacylglycerol is triacylglycerol where saturated fatty acids (S) are bonded to 1- and 3-positions of the glycerol skeleton and oleic acid (O) is bonded to 2-position of the skeleton. The saturated fatty acid (S) has preferably 16 or more carbon atoms, more preferably 16 to 22 carbon atoms, and even more preferably 16 to 18 carbon atoms. The SOS content contained in the chocolate mix in the present invention is preferably 50 to 90% by mass and more preferably, 60 to 90% by mass in the oils and fats contained in the chocolate mix.

The chocolate mix containing 26 to 70% by mass of StOSt in the oils and fats contained in the chocolate mix can be used to prepare chocolate mix containing a desired amount of StOSt in the oils and fats by using a cacao equivalent fat containing StOSt stated below.

[Addition Step]

The temperature of the chocolate mix in the addition step may be 32 to 40° C. This chocolate mix temperature is higher than the conventional chocolate mix temperature in the seeding method (about 30° C.) and is equal to or lower than the melting point of the β form StOSt crystal (about 40° C.). By keeping the chocolate mix temperature at 32 to 40° C., increase in viscosity of chocolate mix can be prevented. Additionally, since oil and fat components with low melting points contained in the seeding agent stated below other than the β form StOSt crystal are melted, the β form StOSt crystal becomes easy to be dispersed homogeneously in the chocolate mix, whereby a stable seeding effect is obtained.

The temperature of chocolate mix in the addition step is preferably 34 to 39° C., more preferably 35 to 39° C., and even more preferably 37 to 39° C. When the temperature of chocolate mix in the addition step is high, seeding is efficiently carried out by increasing the added amount of the seeding agent comprising at least the β form StOSt crystal stated below. The temperature of chocolate mix in the addition step indicates a temperature at the time when a seeding agent is added to chocolate mix.

(β Form StOSt Crystal and Seeding Agent)

To the chocolate mix in the present invention, a seeding agent comprising at least a β form StOSt crystal is added in the addition step. The seeding agent in the present invention may be composed of a β form StOSt crystal or may contain other oils and fats, solid components (sugars or powdered milk), and the like as a dispersing medium, in addition to the β form StOSt crystal. The content of the β form StOSt crystal in the seeding agent is preferably 10% by mass or more, and more preferably 30% by mass or more.

The β form StOSt crystal used in the present invention is a stable crystal of 1,3-distearoyl-2-oleoylglycerol (StOSt), whose chain-length structure is that of triple chain and whose sub-lattice shows a β form triclinic crystal. It is judged based on the diffraction peaks obtained by the determination of X-ray diffraction (powder method) that the crystal form of StOSt is a triple-chain length β form. In other words, in the determination of a short spacing of an oil and fat crystal in the range of 2θ being from 17 to 26 degrees by X-ray diffraction, when a strong diffraction peak corresponding to a spacing of 4.5 to 4.7 Å is detected and a diffraction peak corresponding to a spacing of 4.1 to 4.3 Å and a diffraction peak corresponding to a spacing of 3.8 to 3.9 Å is not detected or is very weak, the oil and fat crystal is judged to be a β form crystal. Further, in the determination of a long spacing of an oil and fat crystal in the range of 2θ being from 0 to 8 degrees, when a strong diffraction peak corresponding to 60 to 65 Å is detected, the oil and fat crystal is judged to be in a triple-chain length structure.

In the β form StOSt crystal which is used in the chocolate mix in the present invention, the ratio of the intensity of the X-ray diffraction peak corresponding to a spacing of 4.1 to 4.3 Å (G'), which is obtained at 20° C., to the intensity of the diffraction peak corresponding to a spacing of 4.5 to 4.7 Å (G), namely G'/G, is preferably 0 to 0.3, more preferably 0 to 0.2, and even more preferably 0 to 0.1. When the intensity ratio of the X-ray diffraction peaks is in the afore-mentioned range, the β form StOSt crystal functions effectively as a seeding agent.

As the β form StOSt crystal used in the present invention, the oil and fat containing StOSt (also referred to as an StOSt-containing oil and fat) is preferably used. Namely, the β form StOSt crystal used in the present invention may be the crystal derived from the oil and fat containing StOSt. Whether or not an oil and fat containing StOSt can be used as the β form StOSt crystal can be judged by determining the X-ray diffraction in a similar manner to the above. The content of StOSt of the oil and fat is handled as the content of β form StOSt crystal in the oil and fat.

As the oil and fat containing StOSt, for instance, mention may be made of the oils and fats, such as sal fat, shea fat, Moller fat, mango kernel oil, Allanblackia fat, and pentadesma fat, as well as a high melting point fraction or an intermediate melting point fraction obtained by fractioning these. In addition, examples of the oil and fat containing StOSt include the oil and fat obtained, based on the known method, by transesterifying a mixture of high oleic sunflower oil and ethyl stearate using a lipase preparation with selectivity for 1- and 3-positions, followed by removal of fatty acid ethyl esters by distillation, and the high melting point fraction or intermediate melting point fraction obtained by fractioning it.

The StOSt content of the oil and fat containing StOSt is preferably at least 40% by mass, more preferably at least 50% by mass, and even more preferably 60 to 90% by mass. When the StOSt content in the oil and fat containing StOSt is in the range described above, the β form StOSt crystal functions efficiently as a seeding agent.

(Preparation Method of β Form StOSt Crystal and Seeding Agent)

The β form StOSt crystal in the present invention can be prepared from the oil and fat containing StOSt. In preparing the β form StOSt crystal from an oil and fat containing StOSt, when the StOSt content in the oil and fat is low (for instance, less than 40% by mass in the oil and fat), a seeding agent containing the β form StOSt crystal in a pasty state or plastic state is obtained by heating the oil and fat to melt the oil and fat crystal; then, carrying out quick cooling crystallization using a quick cooling and kneading device such as Onlator, Kombinator, or Votator; and then, keeping the temperature at approximately 27° C. for approximately one day.

When the StOSt content in the oil and fat is high (for instance, 40% by mass or higher in the oil and fat), the oil and fat can be used to prepare the β form StOSt crystal: by heating the oil and fat to melt the oil and fat crystal; then, cooling down to about 30° C.; adding a seeding agent comprising a β form StOSt crystal in a pasty state prepared, for instance, as described above; then, carrying out partial crystallization until the whole becomes a slurry while maintaining the temperature approximately at 30° C.; then, casting into a resin mold, etc.; further solidifying at 28 to 30° C.; and carrying out aging appropriately to stabilize the crystal. The oil and fat containing the thus-prepared aggregated β form StOSt crystal is pulverized appropriately, preventing the oil and fat crystal from melting (for instance, in a circumstance where a temperature is −20° C. or lower) and the resulting oil and fat can be used as a seeding agent in a powder form.

The seeding agent containing the β form StOSt crystal used in the chocolate mix in the present invention is preferably in a state of powder. The average particle size of the powder is preferably from 20 to 200 μm, more preferably 40 to 160 μm, and even more preferably 60 to 140 μm.

In order to improve dispersibility of the powder, the powder may be mixed with powder of solid bodies such as saccharides, starch, and milk solids (preferably the powder with an average particle size of 20 to 140 μm) to prepare an oil and fat composition, which may be used as the seeding agent containing the β form StOSt crystal in the present invention. In order to improve dispersibility, the powder may be dispersed at approximately 30° C. in cocoa butter or cacao equivalent fat in a melted state to prepare slurry, which may be used as the seeding agent containing the β form StOSt crystal in the present invention.

As another aspect for preparing the β form StOSt crystal from an oil and fat containing StOSt, for instance, the oil an fat containing StOSt is mixed with powder in a solid state such as saccharides, starch, and milk solids, etc.; the grain size is controlled using a roll refiner, etc. as required; then tempering is carried out, so as to prepare an oil and fat composition, which may be used as the β form StOSt crystal in the present invention.

(Added Amount of β Form StOSt Crystal)

The amount of β form StOSt crystal to be added to the chocolate mix in a melted state in the addition step is preferably 0.05 to 5% by mass, more preferably 0.1 to 4.5% by mass, and even more preferably 0.2 to 4% by mass relative to the oils and fats in the chocolate mix. When the added amount of β form StOSt crystal is in the range described above, a stable seeding effect is expectable even if the temperature of the chocolate mix is high (for instance 32 to 40° C.) or, further, the chocolate mix is held under such a high temperature.

After the β form StOSt crystal is added to the chocolate mix, the β form StOSt crystal may be dispersed homogeneously in the chocolate mix by stirring, etc.

[Holding Step]

In order to prevent the increase in viscosity of the chocolate mix, the temperature of the chocolate mix in a melted state in the present invention may be held at 32 to 40° C. for 10 minutes or more, after the addition step. The increase in viscosity of chocolate mix can be effectively prevented by adding the β form StOSt crystal to the chocolate mix, and, even after the addition, by holding the chocolate mix at 32 to 40° C., preferably for 15 minutes or more, and more preferably for 30 minutes or more. The temperature of the chocolate mix in the holding step is preferably 34 to 39° C., more preferably 35 to 39° C., and even more preferably 37 to 39° C.

The time period for which the chocolate mix is held at 32 to 40° C. in the holding step is preferably 1 to 24 hours, more preferably 2 to 12 hours, and even more preferably 3 to 8 hours. When the holding time period is within the aforementioned range, the viscosity of the chocolate mix after the addition step may be suppressed to 1.15 times or less (more preferably 1.1 times or less) of the viscosity of the chocolate mix at the time of the addition of the β form StOSt crystal and, therefore, handling of chocolate mix, including a use of coating with an enrober and the like, becomes easier. According to the present invention, it is also possible to suppress the viscosity of the chocolate mix, for 30 minutes or more after the addition of the β form StOSt crystal to the chocolate mix, to 1.2 times or less of the viscosity of the chocolate mix at the time of the addition of the β form StOSt crystal. The viscosity of the chocolate mix at the time of the addition of the β form StOSt crystal and the viscosity after the addition step are measured under the same temperature conditions and compared to each other.

The viscosity of the chocolate mix in the present invention can be determined as a plastic viscosity obtained by using, for instance, a viscometer of BH type, which is a rotary viscometer, rotating a rotor of No. 6 at 4 rpm at a measuring temperature, and multiplying the reading value after three rotations by the device coefficient.

[Coating Step]

The chocolate-covered food product of the present invention is obtained by coating a desired food product with the chocolate mix obtained after the addition step or after the addition step and the holding step. The methods for coating a food product with chocolate mix is not limited to particular ones and the known methods can be used for the production. For instance, mention may be made of a method of enrobing, coating or spraying of chocolate mix to a food product. A food product may be dipped in chocolate mix. In coating a food product with chocolate mix, the chocolate mix may be impregnated into the inside of the food product by applying treatment such as vacuum and the like additionally.

The temperature of chocolate mix at the time when a food product is coated may be approximately equivalent to the temperature of the chocolate mix in the addition step, for instance, 32 to 40° C.

The viscosity of chocolate mix at the time when a food product is coated is preferably 5000 to 40000 cP (centipoise), more preferably 10000 to 35000 cP, and even more preferably 10000 to 30000 cP. When the viscosity of chocolate mix is in the range described above, the chocolate mix can be efficiently applied to a food product.

The chocolate mix to be used in the coating step may be the chocolate mix after a lapse of 15 minutes or more after the addition of a seeding agent in the addition step, at the time when a food product is coated with the chocolate mix (in other words, the chocolate mix after the holding step where the holding time is 15 minutes or more). According to the present invention, even the chocolate mix after the holding step is preferred, because an increase in viscosity is adequately prevented.

The temperature of a food product at the time when the food product is coated with chocolate mix may be relatively high as is the case in freshly-baked confectioneries or bread. For instance, the temperature of a food product at the time when the food product is coated with chocolate mix may be 30 to 40° C., or 35 to 40° C.

The food products to be coated with chocolate mix may be any food products, not limited to particular ones, but dried food such as dried fruit or nuts, confectioneries or bread, is preferred. As the examples of confectioneries and bread, mention may be made of unbaked cakes, such as cream puffed confectioneries (including eclair and cream puff), pies, and waffles; sponge cakes (including short cakes, rolled cakes, decorated cakes, tortes, and chiffon cakes); butter cakes (including pound cakes, fruit cakes, madeleines, baumkuchen, and Kasutera sponge cakes); baked cakes, such as biscuits, cookies, crackers, pretzels, wafers, sables, langue de chat, macaroons, and rusks; and breads, such as white bread, sweet bun, French bread, stollen, brioche, doughnuts, Danish, and croissant.

[Cooling Solidification Step]

The chocolate mix obtained after the addition step, or after the addition step and the holding step, may be cooled and solidified, whereby chocolate can be prepared from chocolate mix efficiently. The food product obtained after the coating step may be cooled and solidified, whereby the applied chocolate mix is cooled and solidified and chocolate-covered food product can be produced efficiently.

The methods for cooling solidification are not limited to particular ones, and the food product can be cooled and solidified by, for instance, blowing cool air using a cooling tunnel, etc. and contact with a cooling plate, depending upon the characteristics of the food product coated with chocolate mix (see, for instance, "Seikayouyushihandobukku (Oil and Fat Handbook for Confectionery)", translated by Iwao Hachiya, 2010, Yuki-Shobou Co., Ltd.)

In the cooling solidification step of the applied chocolate mix in the production of chocolate-covered food product, generally strict temperature control is required, depending upon type of chocolate mix. In particular, when chocolate mix of a tempered type is used, contraction state of the chocolate mix differs depending upon the amount of stable crystal generated in the tempering. Accordingly, if strict temperature control is not carried out, cracks or bloom easily generate in chocolate. These issues easily occur when chocolate is cooled slowly, namely, cooled at a relatively high temperature for a long time. However, according to the present invention, even under slow cooling solidification conditions, chocolate-covered food products with fewer cracks and good bloom resistance are obtained. More specifically, even when chocolate mix is cooled slowly in the atmosphere of 18 to 31° C. (ambient temperature), more preferably in the atmosphere of 18 to 28° C., or even more preferably in the atmosphere of 19 to 26° C., chocolate-covered food products which are good in bloom resistance are obtained.

(Chocolate)

"Chocolate" according to the present invention is not the one limited by "Fair Competition Codes relating to Designation of Chocolates" (Japan Chocolate Industry Fair Trade Conference) or the stipulations as laws, but refers to the one whose main raw material is an edible oil and fat and sugars; which further comprises a cacao component (including cacao mass and cocoa powder), a milk product, a flavor, and an emulsifier, etc.; and which is produced via a part or whole of the steps for producing chocolate (a mixing step, a particle size reduction step, a refining step, a tempering step, a shaping step, and a cooling step, etc.) The chocolate in the present invention also includes white chocolate and colored chocolate, etc., in addition to dark chocolate and milk chocolate.

The content of oils and fats contained in the chocolate in the present invention (which indicates the total of all the oils and fats contained in the chocolate, similarly to the definition of "the oil and fat in the chocolate mix" described above) is preferably 25 to 70% by mass, more preferably 30 to 60% by mass, and the most preferably 30 to 50% by mass from the point of workability or flavor.

Chocolate mix and chocolate in the present invention may include, in addition to oils and fats, cacao mass, cocoa powder, sugars, milk products (milk solids, etc.), emulsifiers, flavors, and pigments which are usually used in chocolate, and may further contain food modifiers including starches, gums, thermo coagulating proteins, and a variety of powder. The chocolate mix can be produced by carrying out mixing of raw materials, reducing a particle size by roll refining, etc., and conching treatment as required, according to the general methods. The chocolate mix in the state where its oil and fat crystal has completely melted by heating in the conching treatment, etc. can be used as the chocolate mix in the present invention. Heating in the conching treatment is preferably carried out at 40 to 60° C. so as to not damage the flavor of chocolate. The chocolate mix in the present invention may be a water-containing substance which contains water, fruit juice, various liquors, milk, condensed milk, fresh cream, etc. and may be any of an emulsion of O/W type and that of W/O type.

The chocolate of the present invention is edible as a molded chocolate as such or may be used in, for instance, confectionery products or bread products, such as bread, cakes, confectioneries, baked cakes, doughnuts, and cream puffed confectioneries as coating or filling or by mixing into dough as a state of tip, whereby a variety of chocolate composite food products (namely, food products having chocolate in a part of raw materials) can be obtained.

As preferred aspects in the production method of chocolate according to the present invention, the following methods may be mentioned. (1) An oil and fat, cacao mass, sugars, a milk product (milk solids, etc.), and an emulsifier are mixed and, then, reduction of a particle size by roll refining and conching treatment are carried out, whereby chocolate mix in a melted state at 32 to 40° C. is prepared. (2) Powder of an oil and fat containing a β form StOSt crystal (seeding agent) is added (seeded) to the obtained chocolate mix in an amount of 0.05 to 5% by mass as the net amount of the β form StOSt crystal, relative to the oils and fats in the chocolate mix in a melted state. After the addition of the seeding agent, the chocolate mix is continuously held at 32 to 40° C. for 30 minutes or more. (3) The obtained seeded chocolate mix in a melted state is cast into a mold to cool and solidify the chocolate mix to obtain chocolate. The conditions for cooling solidification may be appropriately adjusted so as to be tailored to the form of chocolate to be produced. In the cooling solidification step, chocolate mix may incorporate air, if required.

(Chocolate-Covered Food Product)

Even though the chocolate mix in the present invention is the chocolate mix of a tempered type which is rich in cocoa butter and in which viscosity of the chocolate mix easily increases, the increase in the viscosity of chocolate mix over time is prevented and, therefore, workability is good. Therefore, according to the present invention, chocolate-covered food products coated with chocolate which is rich in chocolate flavor can be efficiently produced.

As one of the preferred aspects in the producing methods of a chocolate-covered food product of the present invention, the following methods can be mentioned. (1) An oil and fat, cacao mass, sugars, a milk product (milk solids, etc.), and an emulsifier are mixed and, then, refining by roll refining and conching treatment are carried out to produce chocolate mix in a melted state at 32 to 40° C. with an StOSt content in the oils and fats being 26 to 70% by mass. (2) To the obtained chocolate mix in a melted state, powder of the oil and fat containing a β form StOSt crystal (seeding agent) is added (seeded) in an amount of 0.05 to 5% by mass as a net amount of the β form StOSt crystal, relative to the oils and fats in the chocolate mix in a melted state. (3) The obtained seeded chocolate mix is held at 32 to 40° C. and applied to a food product. (4) After removing surplus chocolate mix, the food product is cooled and solidified under an atmosphere of 18 to 31° C. (ambient temperature) to obtain a chocolate-covered food product.

EXAMPLES

Below, the present invention will be further concretely described by presenting the Examples. Each content of triacylglycerol in oil and fat and a viscosity of chocolate mix at each temperature was determined by the following methods.

(Triacylglycerol Content)

Each content of triacylglycerol was measured by a gas chromatography method (conforming to JAOCS, vol. 70, 11, pp. 1111-1114 (1993)) and silver ion column-HPLC method (conforming to J. High Resol. Chromatogr., 18, pp. 105-107 (1995)).

(Viscosity of Chocolate Mix)

The viscosity of chocolate mix was obtained by using a viscometer of BH type (manufactured by Toki Sangyo), rotating a rotor of No. 6 at 4 rpm, and multiplying the reading value after three rotations by the device coefficient (2500).

[Preparation of StOSt-Containing Oil and Fat]

According to the known method, 60 parts by mass of ethyl stearate was mixed with 40 parts by mass of high oleic sunflower oil and a lipase preparation with selectivity for 1- and 3-positions was added to perform transesterification. The lipase preparation was removed by filtration treatment and the obtained reactants were subjected to thin film distillation, whereby fatty acid ethyl esters were removed from the reactants to obtain a distillation residue. The obtained distillation residue was subjected to dry fractionation to remove a high melting point fraction and, from the obtained low melting point fraction, the low melting point fraction in the second stage was removed by acetone fractionation, whereby an intermediate melting point fraction was obtained. The obtained intermediate melting point fraction was subjected to acetone removing, depigmentation, and deodorant treatment based on the ordinary methods, to obtain the StOSt-containing oil and fat with the StOSt content being 67.3% by mass.

[Preparation of β Form StOSt Crystal (Seeding Agent)-I]

Following the method below, seeding agent A and seeding agent B were obtained, which are oils and fats containing the β form StOSt crystal. The crystal form of the obtained seeding agents and the contents of the β form StOSt crystal are summarized in Table 1.

(Seeding Agent A)

75 parts by mass of high oleic sunflower oil and 25 parts by mass of an StOSt-containing oil and fat (StOSt content: 67.3% by mass) were mixed; the crystal of the oil and fat was completely melted at 60° C.; and then quick cooling crystallization was performed in Onlator, followed by keeping the temperature at 27° C. for one day to obtain seeding agent A in a pasty state.

(Seeding Agent B)

An StOSt-containing oil and fat (StOSt content: 67.3% by mass) was heated to melt the oil and fat crystal completely, followed by cooling, and seeding agent A was added in an amount of 0.5% by mass relative to the amount of the oil when the oil temperature was 30° C., followed by cooling to 20° C. After cooling, a tempering cycle of 38° C. for six hours and 30° C. for six hours was repeated over five cycles, followed by pulverization at −20° C., and, then, sieving was carried out, whereby seeding agent B in a powdery state with an average particle size of 100 μm was obtained.

TABLE 1

| Properties and states of seeding agents | | |
| --- | --- | --- |
| Seeding agent | A | B |
| State | Pasty state | Powder state |
| Intensity ratio of diffraction peaks (G'/G) | 0 | 0.03 |
| Crystal form of oil and fat | Triple-chain length structure β form | Triple-chain length structure β form |
| Content of β form StOSt crystal | 16.8% by mass | 67.0% by mass |

[Evaluation of Seeding to Chocolate Mix-1]

According to the formulation of Table 2, the raw materials were mixed and, then, roll refining and conching were performed based on the ordinary methods, whereby chocolate mix A in a melted state with a temperature of the chocolate mix being 35° C. was prepared (oil and fat content of the chocolate mix: 35% by mass). To the chocolate mix in a melted state, seeding agent B was added in an amount of 0.5% by mass relative to the oil (0.335% by mass as the β form StOSt crystal relative to the oils and fats in the chocolate mix in a melted state), followed by holding at 35° C. while stirring. At each point of time of 60 minutes, 120 minutes and 180 minutes after the addition of the seeding agent, each chocolate mix was taken out, cast into a mold made of polycarbonate, and cooled and solidified in a refrigerator at 10° C. (Examples 1 to 3). As a reference, a chocolate (Reference Example 1) was prepared not by adding a seeding agent, but by carrying out an ordinary tempering operation and cooling solidification (a small tempering instrument (manufactured by Pavioni, Minitemper) was used to cool the chocolate mix in a melted state, which had been already heated up to 50° C., down to 30° C., followed by holding at 30° C. for one minute and then at 32° C. for three minutes). Also, another chocolate was prepared by leaving the chocolate mix in a melted state at 35° C. to cool and solidify as such, without adding a seeding agent or performing any tempering operation (Comparative Example 1).

Regarding the chocolates of Comparative Example 1, Examples 1 to 3, and Reference Example 1 as prepared in the above, product quality evaluation was performed according to the following evaluation criteria. Further, Comparative Example 1 and Examples 1 to 3, the determination of the viscosities of the chocolate mixs was carried out at 35° C. when the chocolate mixs were taken out. The results are shown in Table 3. In Table 3, "*" indicates a holding time after seeding (unit: minute); "–" indicates that evaluation was impossible to be performed; and "+" indicates a factor of a viscosity of a chocolate mix in assuming that the viscosity of the chocolate mix of Comparative Example 1 was 1.

(Evaluation of Releasing from Mold)

Releasing percentage (percentage of chocolate which is released from the mold) at 15 minutes after cooling solidification at 10° C.

Double circle: very good (releasing percentage: 90% or higher)

Circle: good (releasing percentage: 70% or higher and less than 90%)

Triangle: partially not released: (releasing percentage: more than 0% and less than 70%)

Cross: impossible to be released (releasing percentage: 0%)

(Evaluation of State of Solidified Surface)

Appearance of the chocolate released from the mold at 15 minutes after cooling solidification at 10° C.

Double circle: very good (no blooming and having good gloss)

Circle: good (no blooming, but partially poor in gloss)

Triangle: not good (no blooming, but poor in gloss)

Cross: bad (bloomed)

(Evaluation of Bloom Resistance 1)

The number of cycles until bloom generated in the case where a released chocolate was stored at 20° C. for one week and was further stored under being subjected to cycles, with each cycle being composed of 32° C. for 12 hours and 20° C. for 12 hours.

Double circle: very good (6 cycles or more)

Circle: good (4 to 5 cycles)

Triangle: not good (2 to 3 cycles)

Cross: bad (0 to 1 cycle)

TABLE 2

Formulation of chocolate mix A

|  | % by mass |
|---|---|
| Cacao mass | 37.80 |
| Cocoa butter | 14.20 |
| Powder sugar | 47.45 |
| Lecithin | 0.5 |
| Flavor | 0.05 |
| Total | 100.0 |
| Content of oil and fat | 35 |
| SOS content in oil and fat | 86.1 |
| StOSt content in oil and fat | 29.1 |

TABLE 3

Evaluation results of chocolate (Seeding agent B, 35° C. seeding)

|  | Comparative Example 1 | Example 1 | Example 2 | Example 3 | Reference Example 1 |
|---|---|---|---|---|---|
| Holding time * | — | 60 | 120 | 180 | — |
| Evaluation of releasing from mold | X | ◎ | ◎ | ◎ | ◎ |
| Evaluation of state of solidified surface | — | ◎ | ◎ | ◎ | ◎ |
| Evaluation of bloom resistance 1 | — | ◎ | ◎ | ◎ | ○ |
| Viscosity of chocolate mix | 28250 | 31250 | 30750 | 30750 | Not determined |
| Viscosity (Factor) + | 1 | 1.11 | 1.09 | 1.09 | — |

[Evaluation of Seeding to Chocolate Mix]

According to the formulation of Table 2, the raw materials were mixed and, then, roll refining and conching were performed based on the ordinary methods, whereby chocolate mix A in a melted state with a temperature of the chocolate mix being 30° C. was prepared (oil and fat content of the chocolate mix: 35% by mass). To the chocolate mix in a melted state, seeding agent B was added in an amount of 0.5% by mass relative to the oil (0.335% by mass as the β form StOSt crystal relative to the oils and fats in the chocolate mix in a melted state), followed by holding at 30° C. while stirring. At each point of time of before the addition of the seeding agent and 10 minutes, 20 minutes, 30 minutes, 40 minutes and 50 minutes after the addition of the seeding agent, chocolate mixs were taken out and the viscosities at each point of time were determined (Comparative Examples 2 to 7). The results are shown in Table 4. In Table 4, "*" indicates a holding time after seeding (unit: minute); "–" indicates that evaluation was impossible to be performed; and "+" indicates a factor of a viscosity of a chocolate mix in assuming that the viscosity of the chocolate mix of Comparative Example 2 was 1.

Further, along with the data of the viscosities of the chocolate mixs of Comparative Example 1 and Examples 1 to 3 in the [Evaluation of Seeding to Chocolate mix-1], the change in a viscosity of the chocolate mixs in the seeding at 30° C. and 35° C. are shown in FIG. 1.

TABLE 4

Evaluation results of chocolates (Seeding agent B, 30° C. seeding)

| | Comparative Example 2 | Comparative Example 3 | Comparative Example 4 | Comparative Example 5 | Comparative Example 6 | Comparative Example 7 |
|---|---|---|---|---|---|---|
| Holding time * | — | 10 | 20 | 30 | 40 | 50 |
| Viscosity of chocolate mix | 31250 | 33250 | 38000 | 45000 | 60750 | 96250 |
| Viscosity (Factor) + | 1 | 1.06 | 1.22 | 1.44 | 1.94 | 3.08 |

[Evaluation of Seeding to Chocolate Mix-3]

According to the formulation of Table 2, the raw materials were mixed and, then, roll refining and conching were performed based on the ordinary methods, whereby chocolate mix A in a melted state with a temperature of the chocolate mix being 35° C. was prepared (oil and fat content of the chocolate mix: 35% by mass). To the chocolate mix in a melted state, seeding agent A was added in an amount of 10% by mass relative to the oil (1.68% by mass as the β form StOSt crystal relative to the oils and fats in the chocolate mix in a melted state), followed by holding at 35° C. while stirring. At each point of time of 60 minutes, 120 minutes and 180 minutes after the addition of the seeding agent, each chocolate mix was taken out, cast into a mold made of polycarbonate, and cooled and solidified in a refrigerator at 10° C. (Examples 4 to 6).

Regarding the chocolates of Examples 4 to 6, product quality evaluation was performed according to the evaluation criteria similar to those in [Evaluation of Seeding to Chocolate mix-1]. The results are shown in Table 5. In Table 5, "*" indicates the holding time after seeding (unit: minute).

TABLE 5

Evaluation results of chocolates (Seeding agent A, 35° C. seeding)

| | Example 4 | Example 5 | Example 6 |
|---|---|---|---|
| Holding time * | 60 | 120 | 180 |
| Evaluation of releasing from mold | ◎ | ◎ | ◎ |
| Evaluation of state of solidified surface | ◎ | ◎ | ◎ |
| Evaluation of bloom resistance 1 | ○ | ○ | ○ |

[Evaluation of Seeding to Chocolate Mix-4]

According to the formulation of Table 2, the raw materials were mixed and, then, roll refining and conching were performed based on the ordinary methods, whereby chocolate mix A in a melted state with a temperature of the chocolate mix being 36° C. was prepared (oil and fat content of the chocolate mix: 35% by mass). To the chocolate mix in a melted state, seeding agent B was added in an amount of 2.0% by mass relative to the oil (1.34% by mass as the β form StOSt crystal relative to the oils and fats in the chocolate mix in a melted state), followed by holding at 36° C. while stirring. At each point of time of 60 minutes, 120 minutes and 180 minutes after the addition of the seeding agent, each chocolate mix was taken out, cast into a mold made of polycarbonate, and cooled and solidified in a refrigerator at 10° C. (Examples 7 to 9). As a reference, a chocolate was prepared by leaving the chocolate mix in a melted state at 36° C. to cool and solidify as such, without adding a seeding agent or performing any tempering operation (Comparative Example 8).

Regarding the chocolates of Comparative Example 8 and Examples 7 to 9 as prepared in the above, product quality evaluation was performed according to the criteria similar to those in [Evaluation of Seeding to Chocolate mix-1]. When the chocolate mixs were taken out, the determination of the viscosities of the chocolate mixs was carried out at 36° C. The results are shown in Table 6. In Table 6, "*" indicates a holding time after seeding (unit: minute); "−" indicates that evaluation was impossible to be performed; and "+" indicates a factor of a viscosity of chocolate mix in assuming that the viscosity of the chocolate mix of Comparative Example 8 was 1.

TABLE 6

Evaluation results of chocolate (Seeding agent B, 36° C. seeding)

| | Comparative Example 8 | Example 7 | Example 8 | Example 9 |
|---|---|---|---|---|
| Holding time * | — | 60 | 120 | 180 |
| Evaluation of releasing from mold | X | ◎ | ◎ | ◎ |
| Evaluation of state of solidified surface | — | ◎ | ◎ | ◎ |
| Evaluation of bloom resistance 1 | — | ◎ | ◎ | ◎ |
| Viscosity of chocolate mix | 33250 | 33750 | 33750 | 32750 |
| Viscosity (Factor) + | 1 | 1.02 | 1.02 | 0.98 |

[Evaluation of Seeding to Chocolate Mix-5]

According to the formulation in Table 7, the raw materials of each of chocolate mixs B and C were mixed, and roll refining and conching were performed based on the ordinary methods, whereby chocolate mix B and chocolate mix C each in a melted state with a temperature of the chocolate mix being 38° C. were prepared (oil and fat content in the chocolate mix: 35% by mass). To each of chocolate mixs B and C each in a melted state, seeding agent B was added in an amount of 5.0% by mass relative to the oil (3.35% by mass as the β form StOSt crystal relative to the oils and fats in the chocolate mix in a melted state), followed by holding at 38° C. while stirring. After the addition of the seeding agent, at each point of time of 60 minutes and 360 minutes in the case of chocolate mix B and at each point of time of 60 minutes and 1440 minutes in the case of chocolate mix C, each chocolate mix was taken out, cast into a mold made of polycarbonate, and cooled and solidified in a refrigerator at 10° C. (chocolate mix B: Examples 10 and 11; chocolate mix C: Examples 12 and 13). As references, chocolates were prepared by leaving chocolate mixs B and C, each in a melted state at 38° C., to cool and solidify as such, without adding a seeding agent or performing any tempering operation (Comparative Examples 9 and 10).

Regarding the chocolates of Comparative Examples 9 and 10 and Examples 10 to 13 as prepared in the above, product quality evaluation was performed according to the evaluation criteria similar to those in the [Evaluation of Seeding to Chocolate mix-1]. When the chocolate mixs were taken out, the determination of the viscosities of the chocolate mixs was carried out at 38° C. The results are shown in Table 8. In Table 8, "*" indicates a holding time after seeding (unit: minute); "−" indicates that evaluation was impossible to be performed; and "+" indicates a factor of a viscosity of chocolate mix in assuming that the viscosities of the chocolate mixs of Comparative Examples 9 and 10 were 1.

was carried out at 39° C. The results are shown in Table 10. In Table 10, "*" indicates a holding time after seeding (unit: minute); "−" indicates that evaluation was impossible to be performed; and "+" indicates a factor of a viscosity of chocolate mix in assuming that the viscosity of the chocolate mix of Comparative Example 1 was 1.

TABLE 7

Formulations of chocolate mixes B and C

|  | Chocolate mix B | Chocolate mix C |
| --- | --- | --- |
|  | % by mass | % by mass |
| Cacao mass | 37.8 | 32.5 |
| Cocoa powder | — | 2.65 |
| StOSt-containing oil and fat | 14.2 | 16.85 |
| Powder sugar | 47.45 | 47.45 |
| Lecithin | 0.5 | 0.5 |
| Flavor | 0.05 | 0.05 |
| Total | 100.0 | 100.0 |
| Content of oil and fat | 35 | 35 |
| SOS content in oil and fat | 84.6 | 84.3 |
| StOSt content in oil and fat | 44.6 | 47.5 |

TABLE 9

Formulation of chocolate mix D

|  | % by mass |
| --- | --- |
| Cacao mass | 26.90 |
| Cocoa powder | 5.50 |
| StOSt-containing oil and fat | 19.60 |
| Powder sugar | 47.45 |
| Lecithin | 0.5 |
| Flavor | 0.05 |
| Total | 100.0 |
| Content of oil and fat | 35 |
| SOS content in oil and fat | 84.0 |
| StOSt content in oil and fat | 50.5 |

TABLE 8

Evaluation results of chocolates (Seeding agent B, 38° C. seeding)

|  | Comparative Example 9 | Example 10 | Example 11 | Comparative Example 10 | Example 12 | Example 13 |
| --- | --- | --- | --- | --- | --- | --- |
| Holding time * | — | 60 | 360 | — | 60 | 1440 |
| Evaluation of releasing from mold | X | ⊚ | ⊚ | X | ⊚ | ⊚ |
| Evaluation of state of solidified surface | — | ⊚ | ⊚ | — | ⊚ | ⊚ |
| Evaluation of bloom resistance 1 | — | ⊚ | ⊚ | — | ⊚ | ⊚ |
| Viscosity of chocolate mix | 27250 | 25250 | 27250 | 27250 | 24000 | 28750 |
| Viscosity (Factor) + | 1 | 0.93 | 1.00 | 1 | 0.88 | 1.06 |

[Evaluation of Seeding to Chocolate Mix-6]

According to the formulation of Table 9, the raw materials were mixed and, then, roll refining and conching were performed based on the ordinary methods, whereby chocolate mix D in a melted state with a temperature of the chocolate mix being 39° C. was prepared (oil and fat content of the chocolate mix: 35% by mass). To the chocolate mix in a melted state, seeding agent B was added in an amount of 2.0% by mass relative to the oil (1.34% by mass as the β form StOSt crystal relative to the oils and fats in the chocolate mix in a melted state), followed by holding at 39° C. while stirring. At each point of time of 60 minutes, 180 minutes and 360 minutes after the addition of the seeding agent, each chocolate mix was taken out, cast into a mold made of polycarbonate, and cooled and solidified in a refrigerator at 10° C. (Examples 14 to 16). As a reference, a chocolate was prepared by leaving the chocolate mix in a melted state at 39° C. to cool and solidify as such, without adding a seeding agent or performing any tempering operation (Comparative Example 11).

Regarding the chocolates of Comparative Examples 11 and Examples 14 to 16 as prepared in the above, product quality evaluation was performed according to the evaluation criteria similar to those in [Evaluation of Seeding to Chocolate mix-1]. When the chocolate mixs were taken out, the determination of the viscosities of the chocolate mixs

TABLE 10

Evaluation results of chocolates (Seeding agent B, 39° C. seeding)

|  | Comparative Example 11 | Example 14 | Example 15 | Example 16 |
| --- | --- | --- | --- | --- |
| Holding time * | — | 60 | 180 | 360 |
| Evaluation of releasing from mold | X | ⊚ | ⊚ | ⊚ |
| Evaluation of state of solidified surface | — | ⊚ | ⊚ | ⊚ |
| Evaluation of bloom resistance 1 | — | ⊚ | ⊚ | ⊚ |
| Viscosity of chocolate mix | 45000 | 43750 | 46000 | 49000 |
| Viscosity (Factor) + | 1 | 0.97 | 1.02 | 1.09 |

[Evaluation of Seeding to Chocolate Mix-7]

According to the formulation of Table 11, the raw materials were mixed and, then, roll refining and conching were performed based on the ordinary methods, whereby chocolate mixs E, F, G, and H each in a melted state with a temperature of the chocolate mix being 36° C. was prepared (oil and fat content of the chocolate mix: 35% by mass). To each of the chocolate mixs each in a melted state, seeding agent B was added in an amount of 0.5% by mass relative to the oil (0.335% by mass as the β form StOSt crystal relative to the oils and fats in the chocolate mix in a melted state), followed by holding for 10 minutes while stirring. At 10 minutes after the addition of the seeding agent, each chocolate mix was taken out, cast into a mold made of polycarbonate, and cooled and solidified in a refrigerator at 10° C. (Comparative Example 12 and Examples 17 to 19). In Table 11, "*" indicates the palm intermediate melting point fraction.

Regarding the chocolates of Comparative Example 12 and Examples 17 to 19 as prepared in the above, product quality evaluation was performed according to the evaluation criteria similar to those in [Evaluation of Seeding to Chocolate mix-1], except that bloom resistance evaluation 2 and bloom resistance evaluation 3 were carried out additionally. The evaluation results are summarized in Table 12. In Table 12, "–" indicates that evaluation was impossible to be performed.

(Bloom Resistance Evaluation 2)

The number of cycles until bloom generated in the case where a released chocolate was stored at 20° C. for one week and was further stored under being subjected to cycles, with each cycle being composed of 37° C. for 12 hours and 20° C. for 12 hours.

Double circle: very good (6 cycles or more)
Circle: good (4 to 5 cycles)
Triangle: bad (2 to 3 cycles)
Cross: bad (0 to 1 cycle)

(Bloom Resistance Evaluation 3)

The number of cycles until bloom generated in the case where a released chocolate was stored at 20° C. for one week and was further stored under being subjected to cycles, with each cycle being composed of 38° C. for 12 hours and 20° C. for 12 hours.

Double circle: very good (6 cycles or more)
Circle: good (4 to 5 cycles)
Triangle: bad (2 to 3 cycles)
Cross: impossible (0 to 1 cycle)

[Evaluation of Seeding to Chocolate Mix-8]

According to the formulation of Table 13, the raw materials were mixed and, then, roll refining and conching were performed based on the ordinary methods, whereby chocolate mixs I, J, K, and L each in a melted state with a temperature of the chocolate mix being 35° C. were prepared (oil and fat content of the chocolate mix: 35% by mass). To each of the chocolate mixs each in a melted state, seeding agent B was added in an amount of 0.5% by mass relative to the oil (0.335% by mass as the β form StOSt crystal relative to the oils and fats in the chocolate mix in a melted state), followed by holding for 10 minutes while stirring. At 10 minutes after the addition of the seeding agent, each chocolate mix was taken out, cast into a mold made of polycarbonate, and cooled and solidified in a refrigerator at 10° C. (Examples 20 to 23).

Regarding the chocolates of Examples 20 to 23 as prepared in the above, product quality evaluation was performed according to the evaluation criteria similar to those in [Evaluation of Seeding to Chocolate mix-7]. The evaluation results are summarized in Table 14.

TABLE 11

Formulations of chocolate mixes E, F, G and H

| | Chocolate mix E | Chocolate mix F | Chocolate mix G | Unit: % by mass Chocolate mix H |
|---|---|---|---|---|
| Cacao mass | 30.2 | 37.8 | 37.8 | 29.49 |
| Cocoa powder | 3.8 | — | — | 4.2 |
| Cocoa butter | — | 14.2 | 5.05 | — |
| PMF * | 18.0 | — | — | — |
| StOSt-containing oil and fat | — | — | 9.16 | 18.32 |
| Powder sugar | 47.45 | 47.45 | 47.44 | 47.44 |
| Lecithin | 0.5 | 0.5 | 0.5 | 0.5 |
| Flavor | 0.05 | 0.05 | 0.05 | 0.05 |
| Total | 100.0 | 100.0 | 100.0 | 100.0 |
| Content of oil and fat | 35 | 35 | 35 | 35 |
| SOS content in oil and fat | 86.0 | 86.1 | 85.1 | 84.0 |
| StOSt content in oil and fat | 14.4 | 29.1 | 39.1 | 49.1 |

TABLE 12

Evaluation results of chocolate (Seeding agent B, 36° C. seeding)

| | Comparative Example 12 | Example 17 | Example 18 | Example 19 |
|---|---|---|---|---|
| Used chocolate mix | E | F | G | H |
| Evaluation of releasing from mold | X | ◉ | ◉ | ◉ |
| Evaluation of state of solidified surface | — | ◉ | ◉ | ◉ |
| Evaluation of bloom resistance 1 | Δ | ◉ | ◉ | ◉ |
| Evaluation of bloom resistance 2 | — | ○ | ◉ | ◉ |
| Evaluation of bloom resistance 3 | — | X | X | ◉ |

TABLE 13

Formulations of chocolate mixes I, J, K and L

| | Chocolate mix I | Chocolate mix J | Chocolate mix K | Unit: % by mass Chocolate mix L |
|---|---|---|---|---|
| Cacao mass | 22.0 | 22.0 | 22.0 | 20.58 |
| Cocoa powder | — | — | — | 0.72 |
| Cocoa butter | 19.9 | 17.6 | 8.43 | — |
| StOSt-containing oil and fat | — | 2.29 | 11.46 | 20.62 |
| Whole milk powder | 12.0 | 12.0 | 12.0 | 12.0 |
| Powder sugar | 45.55 | 45.56 | 45.56 | 45.53 |

TABLE 13-continued

Formulations of chocolate mixes I, J, K and L

| | Chocolate mix I | Chocolate mix J | Chocolate mix K | Chocolate mix L |
|---|---|---|---|---|
| | | | | Unit: % by mass |
| Lecithin | 0.5 | 0.5 | 0.5 | 0.5 |
| Flavor | 0.05 | 0.05 | 0.05 | 0.05 |
| Total | 100.0 | 100.0 | 100.0 | 100.0 |
| Content of oil and fat | 35 | 35 | 35 | 35 |
| SOS content in oil and fat | 78.7 | 78.4 | 77.5 | 76.6 |
| StOSt content in oil and fat | 26.6 | 29.1 | 39.1 | 49.1 |

TABLE 14

Evaluation results of chocolate (Seeding agent B, 35° C. seeding)

| | Example 20 | Example 21 | Example 22 | Example 23 |
|---|---|---|---|---|
| Used chocolate mix | I | J | K | L |
| Evaluation of releasing from mold | ◎ | ◎ | ◎ | ◎ |
| Evaluation of state of solidified surface | ◎ | ◎ | ◎ | ◎ |
| Evaluation of bloom resistance 1 | ◎ | ◎ | ◎ | ◎ |
| Evaluation of bloom resistance 2 | X | ◎ | ◎ | ◎ |
| Evaluation of bloom resistance 3 | X | X | X | ◎ |

[Preparation of BOB-Containing Oil and Fat and β Form BOB Crystal (Seeding Agent C)]

According to the known method, 60 parts by mass of ethyl behenate was mixed with 40 parts by mass of high oleic sunflower oil, and a lipase preparation with selectivity for 1- and 3-positions was added to perform transesterification. The lipase preparation was removed by filtration treatment and the obtained reactants were subjected to thin film distillation, whereby a fatty acid ethyl ester was removed from the reactants to obtain a distillation residue. The obtained distillation residue was subjected to dry fractionation to remove a high melting point fraction and, from the obtained low melting point fraction, the low melting point fraction in the second stage was removed by acetone fractionation, whereby an intermediate melting point fraction was obtained. The obtained intermediate melting point fraction was subjected to acetone removing, depigmentation, and deodorant treatment based on the ordinary methods, to obtain the BOB-containing oil and fat with the BOB content being 65.0% by mass.

Then, the BOB-containing oil and fat was melted completely; cooling solidification was carried out to 20° C.; then, a tempering cycle of 30° C. for 12 hours and 50° C. for 12 hours was repeated over 14 cycles; pulverization was carried out at −20° C.; and, then, sieving was carried out, whereby seeding agent C in a powdery state with an average particle size of 100 μm was obtained. Upon confirming the crystal form of seeding agent C using X-ray diffraction, it was confirmed that the seeding agent was of triple chain (diffraction line corresponding to 70 to 75 Å) and in β form (very strong diffraction line corresponding to 4.5 to 4.7 Å).

TABLE 15

Properties and state of seeding agent

| Seeding agent | C |
|---|---|
| State | Powder state |
| Intensity ratio of diffraction peaks (G'/G) | 0 |
| Crystal form of oil and fat | Triple-chain length structure β form |
| Content of β form BOB crystal | 65.0% by mass |

[Evaluation of Seeding to Chocolate Mix-9]

According to the formulation of Table 16, the raw materials were mixed and, then, roll refining and conching were performed based on the ordinary methods, whereby chocolate mix M in a melted state with a temperature of the chocolate mix being 38° C. was prepared (oil and fat content of the chocolate mix: 40% by mass). To the chocolate mix in a melted state, seeding agent B was added in an amount of 1.0% by mass relative to the oil (0.67% by mass as the β form StOSt crystal relative to the oils and fats in the chocolate mix in a melted state), followed by holding for 10 minutes while stirring. At 10 minutes after the addition of the seeding agent, the chocolate mix was taken out, cast into a mold made of polycarbonate, and cooled and solidified in a refrigerator at 10° C. (Example 24). To chocolate mix M in a melted state with a temperature of the chocolate mix being 38° C. (oil and fat content of the chocolate mix: 40% by mass), seeding agent C was added instead of seeding agent B in an amount of 1.0% by mass relative to the oil (0.65% by mass as the β form BOB crystal relative to the oils and fats in the chocolate mix in a melted state), followed by holding for 10 minutes while stirring. At 10 minutes after the addition of the seeding agent, the chocolate mix was taken out, cast into a mold made of polycarbonate, and cooled and solidified in a refrigerator at 10° C. (Comparative Example 13).

Regarding the chocolates of Example 24 and Comparative Example 13 as prepared in the above, product quality evaluation was performed according to the evaluation criteria similar to those in [Evaluation of Seeding to Chocolate mix-7], except that performing of the bloom resistance evaluation 1 was skipped. The evaluation results are summarized in Table 17.

TABLE 16

Formulation of chocolate mix M

| | Unit: % by mass |
|---|---|
| Cacao mass | 22.0 |
| Cocoa powder | 8.55 |
| StOSt-containing oil and fat | 23.56 |
| Whole milk powder | 13.76 |
| Powder sugar | 31.58 |
| Lecithin | 0.5 |
| Flavor | 0.05 |
| Total | 100.0 |
| Content of oil and fat | 40 |
| SOS content in oil and fat | 76.5 |
| StOSt content in oil and fat | 49.1 |

TABLE 17

Evaluation results of chocolates (38° C. Seeding)

|  | Example 24 | Comparative Example 13 |
|---|---|---|
| Used chocolate mix | M | M |
| Seeding agent | B | C |
| Evaluation of releasing from mold | ⊚ | ▲ |
| Evaluation of state of solidified surface | ⊚ | X |
| Evaluation of bloom resistance 2 | ⊚ | X |
| Evaluation of bloom resistance 3 | ⊚ | X |

[Preparation of β Form StOSt Crystal (Seeding Agent)-II]

Seeding agent B was prepared in the method similar to that of (Seeding Agent B) of the [Preparation of β Form StOSt Crystal (Seeding Agent)-I].

[Preparation of Chocolate Mix-I]

According to the formulation of Table 18, the raw materials were mixed and, then, roll refining and conching were performed based on the ordinary methods, whereby chocolate mix A-2 in a melted state with a temperature of the chocolate mix being 45° C. was prepared (oil and fat content of the chocolate mix: 40% by mass). The chocolate mix in a melted state was cooled to 28° C., held for one minute, then, heated up to 30° C., and held at 30° C. After being heated up to 30° C., the chocolate mix was taken out at each point of time of 0 minute, 20 minutes, 40 minutes, and 60 minutes and the viscosity of the chocolate mix at each point of time was determined (Comparative Example 14). Further, separately from this, chocolate mix A-2 in a melted state with a temperature of the chocolate mix being 45° C. was cooled to 28° C., held for one minute, then, heated up to 30° C., and held at 30° C. for 10 minutes. Then, the chocolate mix was heated up to 35° C. and held at 35° C. for 10 minutes. After the holding of 10 minutes, the chocolate mix was taken out at each point of time of 0 minute, 20 minutes, 60 minutes, and 180 minutes, under keeping 35° C., and the viscosity of the chocolate mix at each point of time was determined (Comparative Example 15). Further, separately from this, chocolate mix A-2 in a melted state with a temperature of the chocolate mix being 45° C. was cooled down to 35° C., and to this, 0.5% by mass relative to the oil (0.335% by mass as the β form StOSt crystal relative to the oils and fats in the chocolate mix in a melted state) of seeding agent B was added and dispersed, followed by holding at 35° C. At each point of time of before the addition of the seeding agent and 20 minutes, 60 minutes, and 180 minutes after the addition of the seeding agent, each chocolate mix was taken out and the viscosity of each chocolate mix at each point of time was determined (Example 25). The change in a viscosity of each chocolate mix in Comparative Examples 14 and 15 and Example 25 are shown in Tables 19 to 21. In Tables 19 to 21, the unit of chocolate mix viscosity is given in centipoise (cP) and "+" indicates a factor of a viscosity of a chocolate mix in assuming that the viscosity of the chocolate mix with a holding time being zero minute was 1.

TABLE 18

Formulation of chocolate mix A-2

| | Unit: % by mass |
|---|---|
| Cacao mass | 40.00 |
| Cocoa butter | 18.00 |

TABLE 18-continued

Formulation of chocolate mix A-2

| | Unit: % by mass |
|---|---|
| Powder sugar | 41.45 |
| Lecithin | 0.5 |
| Flavor | 0.05 |
| Total | 100.0 |
| Content of oil and fat | 40 |
| SOS content in oil and fat | 86.1 |
| StOSt content in oil and fat | 29.1 |

TABLE 19

Comparative Example 14: change in viscosity of chocolate mix (Held at 30° C. after tempering)

| | Holding time (Minutes) | | | |
|---|---|---|---|---|
| | 0 | 20 | 40 | 60 |
| Viscosity of chocolate mix (cP) | 17500 | 19750 | 27750 | 50000 |
| Viscosity (Factor) + | 1 | 1.13 | 1.59 | 2.86 |

TABLE 20

Comparative Example 15: change in viscosity of chocolate mix (Held at 35° C. after tempering)

| | Holding time (Minutes) | | | |
|---|---|---|---|---|
| | 0 | 20 | 60 | 180 |
| Viscosity of chocolate mix (cP) | 16250 | 16250 | 16500 | 16500 |
| Viscosity (Factor) + | 1 | 1 | 1.02 | 1.02 |

TABLE 21

Example 25: change in viscosity of chocolate mix (Held at 35° C. after seeding)

| | Holding time (Minutes) | | | |
|---|---|---|---|---|
| | 0 | 20 | 60 | 180 |
| Viscosity of chocolate mix (cP) | 15750 | 16000 | 16000 | 16000 |
| Viscosity (Factor) + | 1 | 1.02 | 1.02 | 1.02 |

[Preparation of Chocolate-Covered Food Product-I]

To the cross-sectional surfaces of commercially available French bread, each of the chocolate mix held at 30° C. for 20 minutes of Comparative Example 14, the chocolate mix held at 35° C. for 20 minutes of Comparative Example 15, and the chocolate mix held at 35° C. for 180 minutes of Example 25 was applied, cooled and solidified in the thermostated chamber at 10° C. to prepare the chocolate-covered food products of Comparative Example 14-1, Comparative Example 15-1 and Example 25-1.

Regarding the chocolate-covered food products of Comparative Example 14-1, Comparative Example 15-1, and Example 25-1 as prepared in the above, product quality evaluation was performed according to the following evaluation criteria. The results are shown in Table 22.

(Evaluation of Melt-in-the-Mouth Property)
Melt-in-the-mouth property when eating a chocolate-covered food product
Double circle: very good
Circle: good
Triangle: not good
Cross: bad
(Evaluation of Heat Resistance)
Tactile Sensation when holding a chocolate-covered food product in a hand
Double circle: very good (no sticky feeling)
Circle: good (slightly sticky feeling occurs after holding for a while)
Triangle: not good (slightly sticky feeling)
Cross: bad (sticky feeling)
(Bloom Resistance Evaluation 4)
The number of cycles until bloom generated in the case where a chocolate-covered food product was stored under being subjected to cycles, with each cycle being composed of 32° C. for 12 hours and 20° C. for 12 hours.
Double circle: very good (6 cycles or more)
Circle: good (4 to 5 cycles)
Triangle: not good (2 to 3 cycles)
Cross: bad (0 to 1 cycle)

TABLE 22

Evaluation results of chocolate-covered food product

|  | Comparative Example 14-1 | Comparative Example 15-1 | Example 25-1 |
|---|---|---|---|
| Melt-in-the-mouth | ◎ | ◎ | ◎ |
| Heat resistance | ○ | X | ○ |
| Bloom resistance | ○ | X | ◎ |

[Preparation of Chocolate Mix-II]
According to the formulation of Table 23, the raw materials were mixed and, then, roll refining and conching were performed based on the ordinary methods, whereby chocolate mixs B-2, C-2 and D-2 each in a melted state with a temperature of the chocolate mix being 45° C. was prepared (oil and fat content of the chocolate mix: 40% by mass). The afore-mentioned chocolate mix B-2 in a melted state was cooled to 30° C., and to this, 1% by mass relative to the oil (0.67% by mass as the β form StOSt crystal relative to the oils and fats in the chocolate mix in a melted state) of seeding agent B was added and dispersed, followed by holding at 30° C. for 30 minutes (Comparative Example 16). Further, separately from this, each of chocolate mixs B-2, C-2, and D-2 each in a melted state with a temperature of the chocolate mix being 45° C. was cooled down to 37° C., and to these, 1% by mass relative to the oil (0.67% by mass as the β form StOSt crystal relative to the oils and fats in the chocolate mix in a melted state) of seeding agent B was added and dispersed, followed by holding at 37° C. for 30 minutes (Comparative Example 17 and Examples 26 and 27).

TABLE 23

Formulations of chocolate mixes B-2, C-2, and D-2

|  | Chocolate mix B-2 | Chocolate mix C-2 | Chocolate mix D-2 |
|---|---|---|---|
|  | Unit: % by mass | | |
| Cacao mass | 34.7 | 40.0 | 34.05 |
| Cocoa powder | 2.7 | — | 3.0 |
| Cocoa butter | — | 7.5 | — |
| Palm intermediate melting point fraction | 20.6 | — | — |
| StOSt-containing oil and fat | — | 10.5 | 20.95 |
| Powder sugar | 41.45 | 41.45 | 41.45 |
| Lecithin | 0.5 | 0.5 | 0.5 |
| Flavor | 0.05 | 0.05 | 0.05 |
| Total | 100.0 | 100.0 | 100.0 |
| Content of oil and fat | 40 | 40 | 40 |
| SOS content in oil and fat | 86.0 | 85.1 | 84.0 |
| StOSt content in oil and fat | 14.4 | 39.1 | 49.1 |

[Preparation of Chocolate-Covered Food Product-II]
Each of the chocolate mixs of the afore-mentioned Comparative Examples 16 and 17 and Examples 26 and 27 was applied to the surfaces of the commercially available biscuits. One on which the chocolate mix of Comparative Example 17 was applied was cooled and solidified in the thermostated chamber at 10° C. to prepare the chocolate-covered food product of Comparative Example 17. Ones on which the chocolate mixs of Comparative Example 16 and Examples 26 and 27 were applied were cooled and solidified in the thermostated chamber at 20° C. to prepare the chocolate-covered food products of Comparative Example 16 and the Examples 26 and 27-1. The temperature of the biscuits used for the application was 21° C.

Regarding the chocolate-covered food products of Comparative Examples 16 and 17 and Examples 26 and 27-1 as prepared in the above, product quality evaluation was performed according to the evaluation criteria in [Preparation of Chocolate-covered Food Product-I], except for the evaluation of bloom resistance as shown below. The results are shown in Table 24.

(Bloom Resistance Evaluation)
The number of days until bloom generated in the case where a chocolate-covered food product was stored at 20° C.
Double circle: very good (60 days or more)
Circle: good (40 to 59 days)
Triangle: not good (30 to 39 days)
Cross: bad (less than 30 days)

TABLE 24

Preparation conditions of chocolate-covered food product and evaluation results

|  | Comparative Example 16 | Comparative Example 17 | Example 26 | Example 27-1 |
|---|---|---|---|---|
| Chocolate mix | B-2 | B-2 | C-2 | D-2 |
| Temperature of chocolate mix (° C.) | 30 | 37 | 37 | 37 |
| Temperature of biscuit ° C.) | 21 | 21 | 21 | 21 |
| Temperature of cooling solidification (° C.) | 20 | 10 | 20 | 20 |
| Evaluation results | | | | |
| Melt-in-the-mouth | ○ | ◎ | ◎ | ○ |
| Heat resistance | X | X | ◎ | ◎ |
| Bloom resistance | X | X | ◎ | ◎ |

[Preparation of BOB-Containing Oil and Fat and β Form BOB Crystal]

BOB-containing oil and fat and β form BOB crystal (seeding agent BOB) were prepared in the method similar to that in the [Preparation of BOB-containing Oil and Fat and β Form BOB Crystal (Seeding Agent C)].

[Preparation of Chocolate Mix-III]

According to the formulation of chocolate mix D-2 in Table 23, the raw materials were mixed and, then, roll refining and conching were performed based on the ordinary methods, whereby the chocolate mix in a melted state with a temperature of the chocolate mix being 37° C. was prepared (oil and fat content of the chocolate mix: 40% by mass). To the chocolate mix in a melted state, 2.0% by mass relative to the oil (1.3% by mass as the β form BOB crystal relative to the oils and fats in the chocolate mix in a melted state) of seeding agent BOB was added and dispersed, followed by holding at 37° C. for 30 minutes (Comparative Example 18). Further, separately from this, to the chocolate mix in a melted state with a temperature of the chocolate mix being 37° C., 1% by mass relative to the oil (0.67% by mass as the β form StOSt crystal relative to the oils and fats in the chocolate mix in a melted state) of seeding agent B was added and dispersed, followed by holding at 37° C. for 30 minutes (Example 27).

[Preparation of Chocolate-Covered Food Product-III]

The chocolate mix of Comparative Example 18 as described above was applied on the surfaces of commercially available biscuits. The one on which the chocolate mix of Comparative Example 18 was applied was cooled and solidified in the thermostated chamber at 20° C. to prepare the chocolate-covered food product of Comparative Example 18. Separately from this, the chocolate mix of Example 27 was applied to the biscuit whose temperature was conditioned to 38° C. The one on which the chocolate mix of Example 27 was applied was cooled and solidified in the thermostated chamber at 25° C. to prepare the chocolate-covered food product of Example 27-2. The temperature of the biscuit used for the application of the chocolate mix of Comparative Example 18 was 21° C.

Regarding the chocolate-covered food products of Comparative Examples 18 and Example 27-2 as prepared in the above, product quality evaluation was performed according to the evaluation criteria similar to those in [Preparation of Chocolate-covered Food Product-II]. The results are shown in Table 25.

TABLE 25

Preparation conditions of chocolate-covered food product and evaluation results

|  | Comparative Example 18 | Example 27-2 |
|---|---|---|
| Chocolate mix | D-2 | D-2 |
| Seeding agent | BOB | B |
| (Added amount relative to oil: % by mass) | (2.0) | (1.0) |
| Temperature of chocolate mix (° C.) | 37 | 37 |
| Temperature of biscuit (° C.) | 21 | 38 |
| Temperature of cooling solidification (° C.) | 20 | 25 |

TABLE 25-continued

Preparation conditions of chocolate-covered food product and evaluation results

|  | Comparative Example 18 | Example 27-2 |
|---|---|---|
| Evaluation results |  |  |
| Melt-in-the-mouth | ○ | ○ |
| Heat resistance | ◎ | ◎ |
| Bloom resistance | X | ◎ |

As described above, it is possible to prevent a viscosity of chocolate mix from increasing, according to the production method of the present invention. Further, according to the production method of the present invention, it is possible to obtain chocolate which is easily released from the mold and is good in a state of solidified surface, bloom resistance and heat resistance. Furthermore, according to the production method of the present invention, even under slow cooling solidification conditions, chocolate-covered food products with fewer cracks and good bloom resistance are obtained.

The invention claimed is:

1. A method for producing chocolate, comprising
   an addition step of adding a seeding agent comprising at least a β form StOSt crystal to a chocolate mix in a melted state at 35 to 39 ° C., and
   a holding step of holding the temperature of the chocolate mix at 35 to 39 ° C. for 30 minutes to 24 hours after the addition step,
   wherein the viscosity of the chocolate mix from the 30 minutes to 24 hours after the addition of the β form StOSt crystal is suppressed to 1.2 times or less of the viscosity of the chocolate mix at the time when the β form StOSt crystal is added;
   wherein the chocolate mix comprises 26 to 70% by mass of StOSt in an oil and fat in the chocolate mix,
   provided that StOSt is 1,3-distearoyl-2-oleolyglycerol.

2. The method for producing chocolate according to claim 1, wherein, in the addition step, the β form StOSt crystal is added in an amount of 0.05 to 5% by mass relative to the oil and fat in the chocolate mix.

3. The method for producing chocolate according to claim 1, wherein the β form StOSt crystal is a crystal derived from the oil and fat containing 40% by mass or more of StOSt.

4. The method for producing chocolate according to claim 1 further comprising a cooling solidification step of cooling and solidifying the chocolate mix after the holding step.

5. A chocolate composite food product, wherein the chocolate obtained by the method for producing chocolate according to claim 1 is used.

6. A method for preventing an increase in viscosity of a chocolate mix, wherein a β form StOSt crystal is added to the chocolate mix in a melted state with a temperature of the chocolate mix being at 35 to 39 ° C., and wherein the chocolate mix is held at 35 to 39 ° C. for 30 minutes to 24 hours after the addition of the β form StOSt crystal,
   wherein the viscosity of the chocolate mix is suppressed, for 30 minutes to 24 hours after the addition of the β form StOSt crystal, to 1.2 times or less of the viscosity of the chocolate mix at the time when the β form StOSt crystal is added.

* * * * *